United States Patent
Lehmann

(10) Patent No.: US 7,434,575 B2
(45) Date of Patent: Oct. 14, 2008

(54) CHAINSAW CHAIN FOR CONCRETE

(75) Inventor: Rolf Lehmann, Hamburg (DE)

(73) Assignee: Dolmar GmbH, Hamburg (DE)

( * ) Notice: Subject to any disclaimer, the term of this patent is extended or adjusted under 35 U.S.C. 154(b) by 55 days.

(21) Appl. No.: 10/591,666

(22) PCT Filed: Feb. 25, 2005

(86) PCT No.: PCT/DE2005/000326

§ 371 (c)(1),
(2), (4) Date: Feb. 9, 2007

(87) PCT Pub. No.: WO2005/084901

PCT Pub. Date: Sep. 15, 2005

(65) Prior Publication Data

US 2008/0000466 A1    Jan. 3, 2008

(30) Foreign Application Priority Data

Mar. 5, 2004    (DE) .................... 10 2004 010 781

(51) Int. Cl.
*B28D 1/08* (2006.01)
(52) U.S. Cl. .......................................... 125/21; 125/22
(58) Field of Classification Search .............. 125/15, 125/18, 21, 22; 83/830, 832, 835
See application file for complete search history.

(56) References Cited

U.S. PATENT DOCUMENTS

| | | | | | |
|---|---|---|---|---|---|
| 4,517,954 | A | * | 5/1985 | deKok et al. | 125/15 |
| 5,215,072 | A | * | 6/1993 | Scott | 125/21 |
| 5,226,404 | A | * | 7/1993 | Mogi et al. | 125/21 |
| 6,138,658 | A | | 10/2000 | Bell | 125/21 |
| 2003/0150442 | A1 | * | 8/2003 | Boland et al. | 125/12 |
| 2003/0213483 | A1 | * | 11/2003 | Sakarcan | 125/15 |
| 2004/0134478 | A1 | * | 7/2004 | Bailey | 125/21 |

FOREIGN PATENT DOCUMENTS

| | | |
|---|---|---|
| DE | 196 20 149 A1 | 11/1997 |
| DE | 199 52 979 A1 | 11/1999 |
| EP | 0 306 767 A1 | 3/1989 |
| EP | 1 155 768 A2 | 11/2001 |
| EP | 1 155 768 B1 | 12/2004 |
| WO | WO 01/76797 A1 | 10/2001 |

* cited by examiner

*Primary Examiner*—Eileen P. Morgan
(74) *Attorney, Agent, or Firm*—Nash and Titus, L.L.C.

(57) ABSTRACT

The invention relates to a chainsaw chain, especially for use in cutting concrete, comprising a plurality of teeth which are respectively provided with at least one cutting segment carrier and at least one cutting segment. The cutting segment comprises diamond punches which are melted into a binding material in such a way that they are embedded therein.

16 Claims, 4 Drawing Sheets

CHAINSAW CHAIN FOR CONCRETE

FIELD OF THE INVENTION

The invention relates to a chain of a chainsaw for concrete, with a plurality of teeth with at least one cutting segment carrier and at least one cutting segment comprising hard-material granules embedded in or melted into a bond (or compounded or fused together), and forming an active surface arranged substantially parallel to a direction of chain travel.

The invention also relates to a process for manufacturing a chain of a chainsaw with a plurality of teeth with at least one cutting segment carrier and at least one cutting segment.

BACKGROUND OF THE INVENTION

Chains of chainsaws and processes for manufacturing them are known in the state of the art. For example, a chain of a chainsaw for concrete is disclosed in DE 199 52 979 A1. In contrast to the cutting of wood, that is removed primarily in the form of chips, when concrete is being cut, fine particles are removed by abrasion as fine dust. The abrasion takes place by active surfaces of cutting segments that comprise diamond granules bound in a bond.

In order to manufacture the chain of a chainsaw the cutting segments are applied in a sintering process onto a base body of steel. At first, a mixture of a diamond powder and a binding powder that contains cobalt, nickel or iron is produced. Both powders are stored in separate storage containers and combined by a powder conveyor. The mixture is applied onto the base body of steel where it is pre-pressed to a green compact. The green compact is subsequently baked and unites with the steel. The sintered binding material is porous and rapidly wears off. The diamonds are no longer bound in firmly enough for strong stresses after a brief usage period of the chain of a chainsaw and can break out. Furthermore, nickel and cobalt are detrimental to health.

Furthermore, melting processes for applying cutting segments onto the bodies (or stem leaves) of separating disks are known from EP 1 155 768 A2 and DE 195 20 149 A1. In these processes a binding powder that is different from the binding powder used in the sintering process described above is at first compounded with diamond powder. The binding powder is a metallic powder based on bronze enriched with alloy elements. The diamond powder is thermally resistant and designed for the processing temperatures of around 900° C. to be expected. After the production of the mixture of diamond powder and binding powder, it is sprayed onto the body, where it is melted with a pulsed Nd:YAG laser. As a result of the melting process the binding merges with an intermediate layer previously applied onto the body and melts the diamonds firmly into the cutting segment. The melting process generates, compared to the sintering process, bodies with segments with a distinctly elevated service life.

EP 0 306 767 A1 discloses a chain of a chainsaw for wood with an associated chainsaw. A carbide layer is melted onto the individual cutting teeth.

WO 10/76797 A1 relates to a chain of a chainsaw for metal for cutting apart wreckage. In it the active surface of the individual sawteeth comprises metallic pieces that are mixed with a hard solder material and soldered on in a hard soldering process.

U.S. Pat. No. 3,343,308 discloses virus cutting and grinding tools. A plurality of grinding elements are sintered onto a carrier at intervals from each other. The individual grinding elements consist of diamond or tungsten carbide particles embedded in a suitable material.

SUMMARY OF THE INVENTION

The invention addresses the problem of making available economic chain of a chainsaw for concrete with an elevated service life and a process for manufacturing a chain of a chainsaw for concrete with an elevated service life.

The problem is solved by an initially cited process in which hard-material granules and binding material are applied onto a support of the cutting segment carrier for the at least one cutting segment, that is positioned obliquely to the direction of chain travel. The binding material for forming the cutting segment is melted and a molten connection is formed between the cutting segment carrier and the cutting segment, and an active surface arranged substantially parallel to the direction of chain travel is formed.

DETAILED DESCRIPTION OF THE PREFERRED EMBODIMENTS

Figure 1:
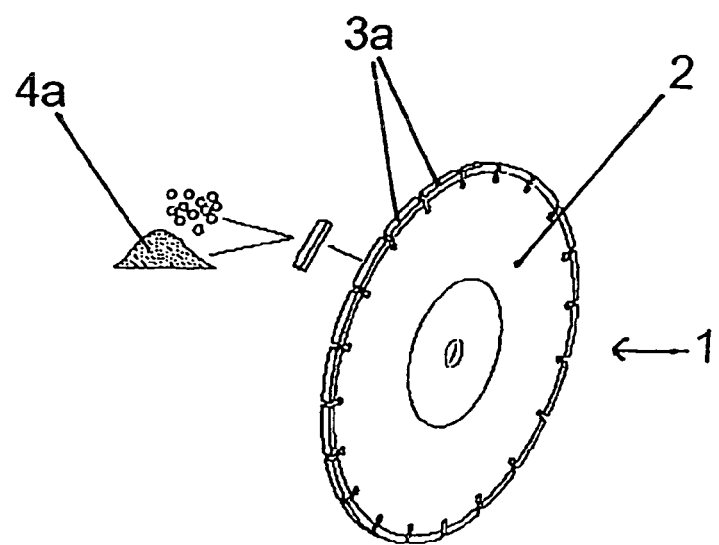
FIG. 1 shows a disk of an abrasive cutting-off machine in accordance with the state of the art with a mixture.

Although the cutting segments of chains of chainsaws for concrete and abrasive cutting-off machines are exposed to various stresses during operation, it has been observed that cutting segments applied during the melting process onto cutting segment carriers of chains of chainsaws for concrete not only do justice to the requirements of durability and service life but even clearly exceed in part the traditional cutting segments applied in the sintering process. Since a binding melt develops during the melting process in which the hard-material granules float, the hard-material granules arranged in an active surface of the cutting segment are surrounded especially far from the bond after the following cooling off and hardening of the binding melt and are thus firmly bound into the bond. The active surface is the surface of the cutting segment which surface makes contact with the material in operation. It removes particles from the material by friction. It is preferably arranged on an outer circumference of the chain of a chainsaw for concrete. Moreover, the bond formed in the melting process has finer pores, is firmer and wears down slower in comparison to sintered bonds. It therefore anchors the hard-material granules longer. Teeth of chains of chainsaws for concrete manufactured in the melting process have, compared to teeth manufactured in the sintering process, a distinctly elevated service life, especially when cutting exposed aggregate concrete.

The binding material is preferably made available as powder and mixed with the hard-material granules to a mixture before it is applied onto the segment carrier. A mixture can be made available with selectable concentrations of hard-material granules, e.g., by a powder conveyor. The selectable concentration of hard-material granules adapts the chain of a chainsaw to the materials to be worked.

The mixture is preferably melted by a laser beam in order to form the cutting segment on the cutting segment carrier. To this end a laser beam with a suitable intensity is directed onto a surface of the cutting segment carrier and the mixture is supplied to the heated area. The mixture is advantageously sprayed coming from the powder conveyor by a spray nozzle onto the cutting segment carrier. The mixture melts when it passes into the (possibly focused) laser beam. It thus forms a binding melt at first and, after it hardens, a molten connection with the cutting segment carrier. A pulsed Nd:YAG laser is preferably used. The processing temperature is preferably approximately 900° C. Thermally stable hard-material granules such as, e.g., a few types of synthetic diamonds are not destroyed at the processing temperature.

In a preferred embodiment of the process an intermediate layer is applied onto the cutting segment carrier before the application of the mixture. The intermediate layer can be applied onto the cutting segment carrier, that preferably comprises steel, at high processing temperatures that would destroy the hard-material granules. The applied and cooled-off intermediate layer is melted again by the laser beam in a subsequent process step, merges with the binding melt and thus forms a particularly stable melt connection.

The binding melt forming during the melting process on the cutting segment carrier can be supported laterally by ingot molds and thus be prevented from deliquescing [dissolving, melting]. The use of ingot molds for shaping is known in melting processes and has proven itself. After hardening, the segment requires no or at the most a slight posttreatment.

During the manufacture, especially of chains of chainsaws for concrete, an active surface substantially parallel to a direction of chain travel is formed from the at least one cutting segment. Chains of chainsaws for concrete can be tightened in particular on chainsaw swords and surround them. The active surface parallel to the direction of chair travel makes complete contact with the material during cutting and therefore removes quite a lot of material. This increases the cutting rate of the chainsaw for concrete.

In an especially preferred embodiment of the invention a tooth of a chain of a chainsaw for wood is used as cutting segment carrier. In this manner a chain of a chainsaw for concrete can be manufactured from a chain of a chainsaw for wood in an especially economical manner in that the cutting segment is melted onto each top of a tooth of a tooth of the chain of a chainsaw for wood. The position of the tooth top, that is oblique in the direction of chain travel, is compensated by a cutting segment that tapers in the direction of chain travel, which forms an active surface parallel in the direction of chain travel. The active surface can be formed by a grinding procedure that follows the hardening of the binding melt and is substantially parallel to the direction of chain travel.

The binding powder is advantageously a metallic powder based on bronze with preferably titanium elements. The binding powder can be enriched with other alloy elements. During the hardening of the binding melt a metallic alloy, preferably a bronze alloy, forms. The titanium unites chemically with the hard-substance granules, especially diamond granules.

Diamond granules are preferably used as hard-substance granules in all above-described processes. Synthetic diamond granules can be produced in great number and are stable even a process temperatures of 900° C.

The problem is also solved by an initially cited chain of a chainsaw for concrete in which the at least one cutting segment carrier comprises a support for the at least one cutting segment that is positioned obliquely to the direction of chain travel, and in which a molten connection is formed between the at least one cutting segment and the at least one cutting segment carrier.

In contrast to chains of chainsaws for wood, that operate by detaching chips, chains of chainsaws for concrete grind extremely small particles out of the material to be worked. Chains of chainsaws for wood have teeth with forwardly running (or leading) teeth that remove the wood chips. Chains of chainsaws for concrete have teeth with active surfaces that remove the particles from the concrete by friction. The chain of a chainsaw for concrete in accordance with the invention, especially a chain of a chainsaw for concrete, can preferably be manufactured by at least one of the processes described above. The anchoring of the hard-material granules in the bond is exposed to high stresses by the friction. On the one hand, the melting connection embeds the hard-material granules particularly firmly in the bond and on the other hand the melt bond wears down more slowly than the traditional sintered bond. The at least one cutting segment resists the stresses longer.

In a preferred embodiment of the invention the at least one cutting segment carrier has a support for the at least one cutting segment, that is obliquely positioned in the direction of chain travel. A cutting segment tapering in the direction of chain travel and compensating the obliquity of the support is placed on the oblique support. It preferably forms an active surface arranged substantially parallel to the direction of chain travel. The embodiment is particularly suited for further processing known chains of chainsaws for wood to chains of chainsaws for concrete. Chains of chainsaws for wood have teeth with teeth tops that are upwardly inclined and oblique in the direction of chain travel. The teeth tops can be the support for the cutting segments. Chains of chainsaws for concrete of the described embodiment can be manufactured quite economically since the chain of a chainsaw for wood serving as base is an advantageous mass-produced article. Moreover, chains of chainsaws for wood have been sufficiently tested and proven.

Cutting segments preferably stand substantially vertically from a surface surrounded by the chain of a chainsaw that is formed during the operation of the chain of a chainsaw by a chainsaw sword. In order to saw through concrete the sword of the chainsaw for concrete must be guided (or re-guided or subsequently guided) into the cut. In order that the guided sword does not become clamped in the cut a free cut is produced by the projecting segments. In another embodiment the cutting segments are conically widened in a cross section transversely to the direction of chain travel starting from the at least one cutting segment carrier. A free cut can also be made in this embodiment. Both variants for producing a free cut can be combined.

The segments advantageously have a thickness between approximately 7 to 8 mm. The thickness is produced by a melting process in accordance with the invention and ensures a sufficient service life of the chain of a chainsaw for concrete.

The hard-material granules preferably comprise diamond granules. The diamond granules can be synthetically produced. The diamond granules preferably have a diameter of 200 µm on the average. The preferred diamond size proved to be especially advantageous for cutting concrete. The diamonds are preferably formed in a cubic, octahedral shape and can therefore be anchored in the bond in a particularly firm manner. They are thermally stable in order to be able to resist process temperatures of even approximately 900° during the melting process.

An intermediate layer is advantageously arranged between the cutting segment carrier and the cutting segment. The intermediate layer forms a melting connection with the cutting segment. The intermediate layer makes possible a particularly stable connection between the cutting segment and the cutting segment carrier.

The invention will now be described in an exemplary manner with reference to the figures.

The separating disk 1 shown in FIG. 1 for an abrasive cutting-off machine comprises a body 2 on whose outer circumference sintered segments 3a are sintered. To this end, at first a diamond powder and a binding powder are supplied to a powder conveyor that are mixed with each other in a predetermined ratio adapted to the technical requirements of separating disk 1. The binding powder comprises metallic granules. Sintering mixture 4a is applied onto the outer circumference of separating disk 1 where it is pre-pressed cold to a green compact. The green compact is then baked. The baking causes the metallic granules to melt on the surface and to adhere to each other. The metallic structure, the sintered bond, produced is porous.

Figure 2:
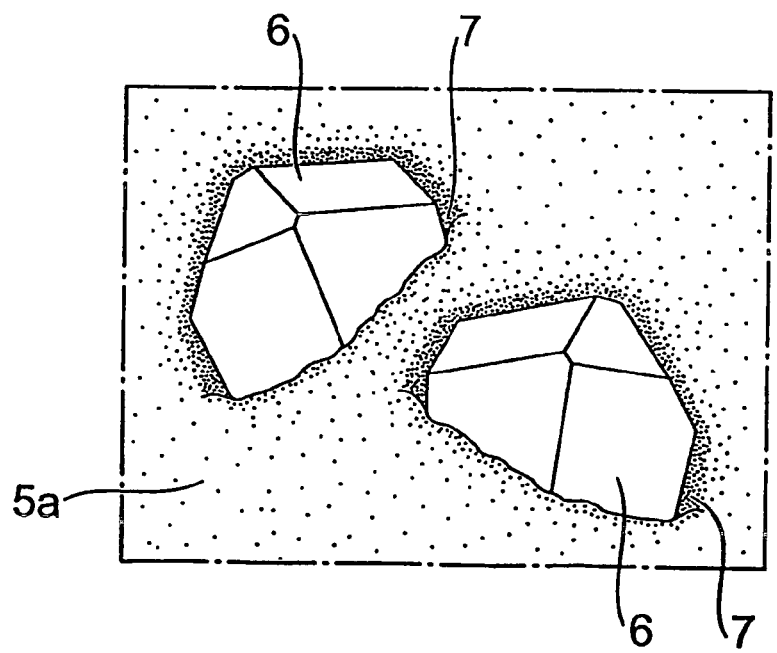
FIG. 2 shows a top view of a sintered bond with diamond granules.

FIG. 2 shows the loose binding in of diamond granules into sintered bond 5a. Sintered bond 5a surrounds diamond granules 6 only insufficiently. In particular, depressions 7 are formed at the contact surface of diamond granules 6 and sintered bond 5a that reduce the size of the contact surface. Under heavy stress diamond granules 6 fall out of sintered bond 5a. Furthermore, it is necessary for the described sintering process to mix nickel and/or cobalt into the binding powder of sintering mixture 4a. Both metals are detrimental to health.

Figure 3:
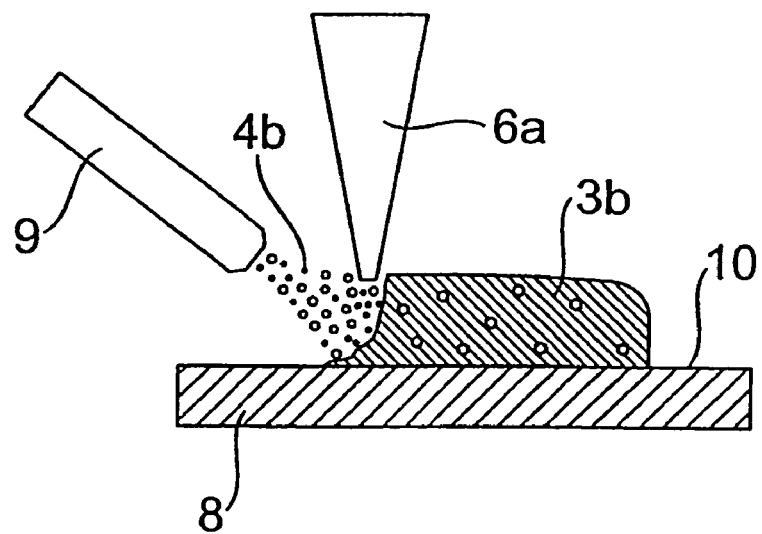
FIG. 3 shows a schematic view of a melting process in accordance with the state of the art.

A melting process schematically shown in FIG. 3 is suitable for applying cutting segments 3b onto a steel body 8 of a chain of a chainsaw for concrete. In this process a laser beam 6a of an Nd:YAG laser with a suitable intensity of $10^3$ to $10^6$ W/cm$^2$ is focused on a steel body 8 to be coated. A mixture 4b is supplied to the focusing area by spray nozzle 9. Mixture 4b melts and merges with intermediate layer 10 that had been previously applied onto steel body 8 and melted by laser beam 6a. Molten mixture 4b hardens and forms cutting segment 3b. In this manner a firm molten connection is formed between steel body 8 and cutting segment 3b. Longer cutting segments 3b can be produced by relative motion between steel body 8 on the one hand and laser beam 6a and spray nozzle 9 on the other hand.

Mixture 4b consists of diamond granules and binding powder. The diamond concentration can be controlled by a powder conveyor (not shown). To this end the diamond granules and the binding powder are transported out of storage containers into the grooves of two pouring disks. The binding powder and the diamond granules are removed by suction at each position of the pouring disks, mixed and melted under an atmosphere of protective gas onto steel body 8. Both disks run with different, freely adjustable speeds. The concentration of diamond granules in mixture 4b can be adjusted by changing the speed ratio. The binding powder consists preferably of metallic powder based on bronze with titanium components that was enriched with alloying elements. Mixture 4b accordingly differs in its composition from sintering mixture 4a. Diamond granules 6 are designed for a processing temperature of 900° C. For this, synthetic, cubic, octahedral diamond granules 6 with a high strength and high thermal stability are used.

Figure 4:
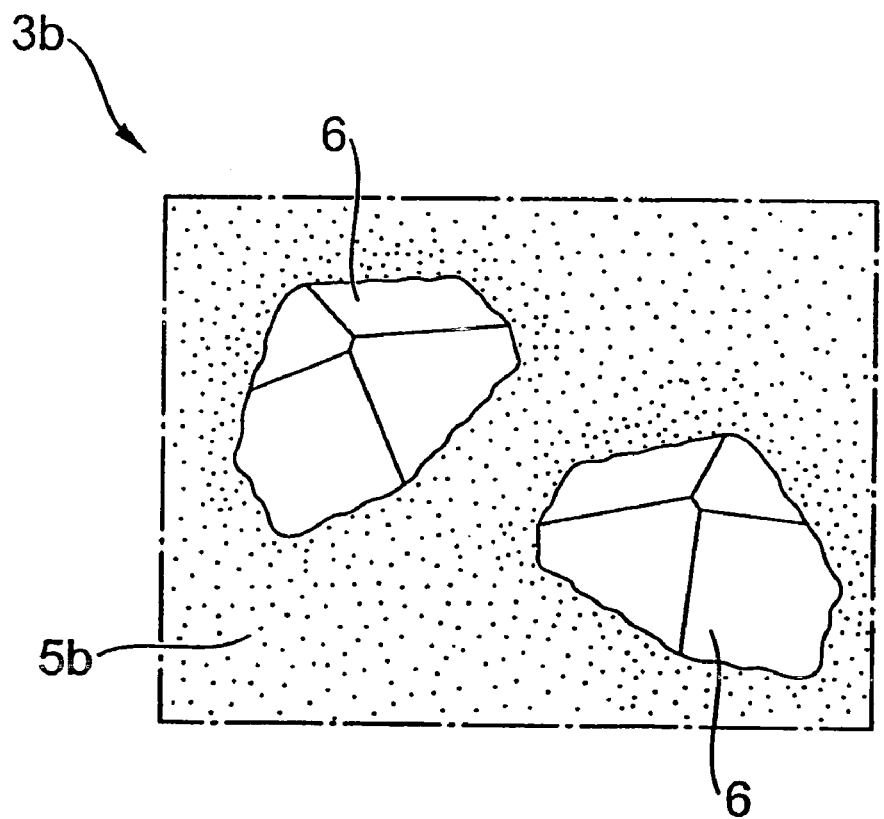
FIG. 4 shows a top view of a part of a segment manufactured by the melting process according to FIG. 3.

FIG. 4 shows a top view of a part of cutting segment 3b. Cutting segment Cutting segment 3b is manufactured by the melting process. A surface of bond 5b runs at the transition between diamond granule 6 and bond 5b without depression to diamond granule 6. Diamond granules 6 are firmly embedded in bond 5b and chemically united with bond 5b. During the melting process diamond granules 6 float in a binding melt and are surrounded by bond 5b after the hardening of the binding melt without the formation of a depression at the contact surface between bond 5b and diamond granule 4. During the cooling off of the binding melt a chemical bond forms between the titanium and diamond granule 6. The binding melt is prevented from deliquescing by ingot molds (not shown) laterally surrounding each tooth. Furthermore, bond 5b produced in the melting process has finer pores on account of the binding melt forming in an intermediate stage than sintered bond 5a produced in the sintering process by the surface baking of metallic granules.

Figure 5:
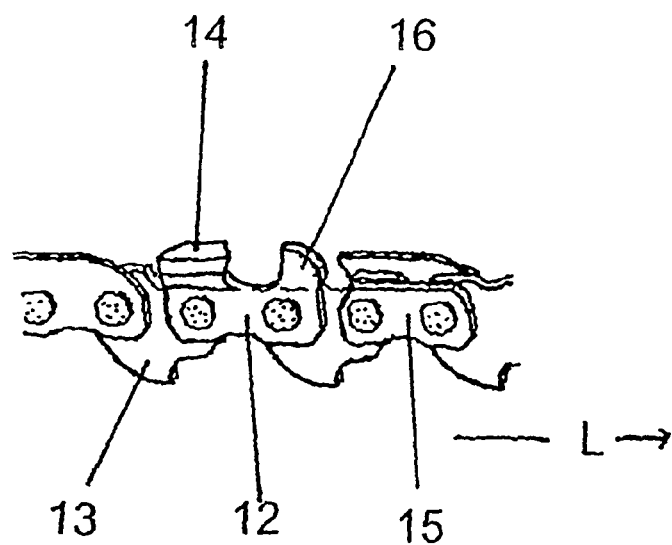
FIG. 5 shows a part of a chain of a chainsaw for wood according to the state of the art.

FIG. 5 shows six members of a chain of a chainsaw for wood. Chains of chainsaws for wood have tooth members 12 in a regular succession, each of which is arranged between two guide members 13. Guide members 13 have the function of guiding the chain of a chainsaw for wood onto a sword (not shown) of a chainsaw for wood (not shown). To this end they are let into a groove in the sword running along the outer circumference of the sword of the chainsaw for wood. Tooth tops 14 of tooth members 12 project from tooth member 12 in the direction of chain travel L alternately to the right and to the left vertically from a sword surface. In FIG. 5 tooth top 14 projects to the right from tooth member 12 in direction of chain travel L. This produces the free cut necessary for guiding the sword through the wood. Linking members 15 are arranged between guide members 13. Tooth members 12, guide members 13 and linking members 15 are articulated to each other. Tooth members 12 are formed in one part from steel. Each tooth member 12 has a forwardly running sawtooth 16 and the following tooth top 14. Tooth top 14 falls off counter to direction of chain travel L of the chain of a chainsaw for wood toward the sword. A forwardly running cutting edge of tooth top 14 is designed to be sharp in order to raise chips out of the wood.

Figure 6:
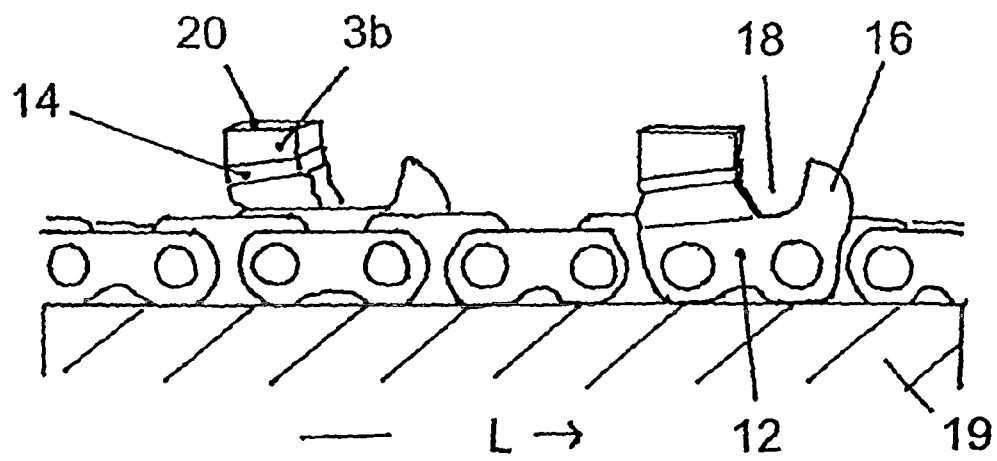
FIG. 6 shows members of a chain of a chainsaw for concrete in accordance with the invention.

FIG. 6 shows the chain of a chainsaw for concrete in accordance with the invention. The chain of a chainsaw for concrete is manufactured on the basis of the chain of a chainsaw for wood shown in FIG. 5. A cutting segment 3b according to FIG. 4 is melted onto tooth top 14 of the chain of a chainsaw for wood by the melting process described in FIG. 3. Tooth member 12 comprises the forwardly running sawtooth 16 spaced from tooth top 14 by groove 18. Tooth top 14 stands vertically on the sword surface and falls off uniformly to sword 19 counter to direction of chain travel L. In order to compensate the obliquity of tooth top 14, cutting segment 3b tapers uniformly in the direction of chain travel L and thus forms active surface 20 running parallel to the direction of chain travel L. The concrete can be removed in a grinding manner by aligning active surface 20 parallel to direction of chain travel L.

Figure 7:
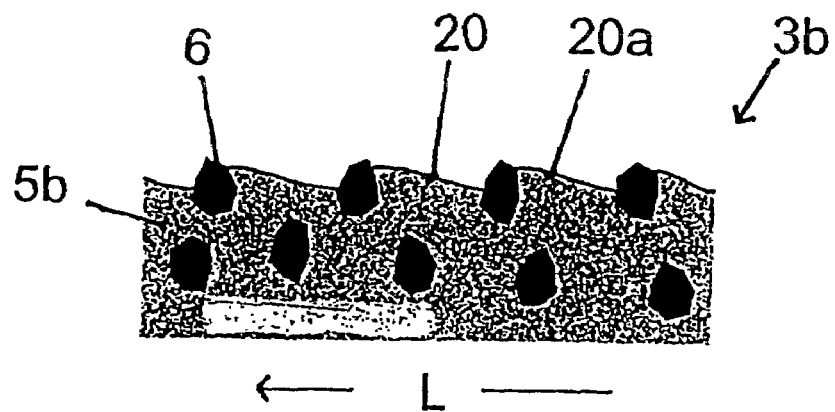
FIG. 7 shows a schematic sectional view of a segment.

FIG. 7 shows a schematic view of a cross section of a cutting segment 3b manufactured by the melting process according to FIG. 3. Diamond granules 6 are uniformly distributed in bond 5b, where they are firmly bonded in. Ramps following or trailing diamond granules 6 stabilize diamond granules 6. Direction of chain travel L runs from right to left in FIGS. 7, 8 and 9. The grinding process typical for the method of operation of chains of chainsaws for concrete takes place by means of diamond granules 6 bound in active surface 20 of cutting segment 3b that lift extremely small particles from the concrete. The selection of the components of bond 5b, as is shown in FIGS. 8 and 9, is decisive for the durability of cutting segment 3b.

Figure 8:
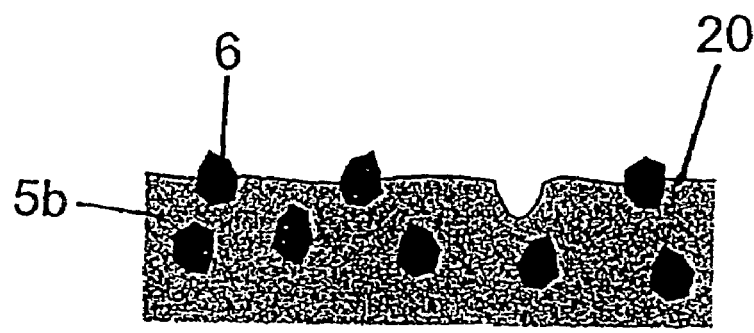
FIG. 8 shows a schematic sectional view of a soft segment.
Figure 9:
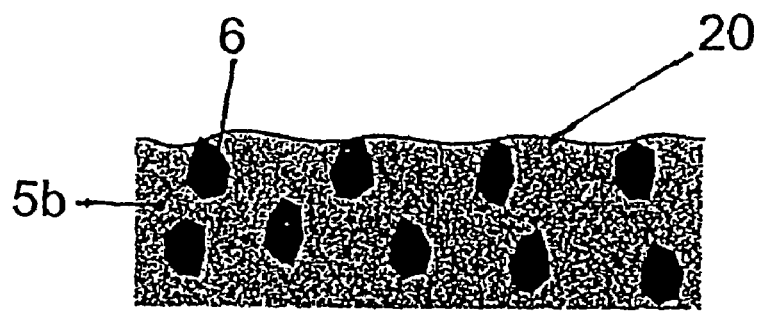
FIG. 9 shows a schematic sectional view of a soft segment.

Bond 5 shown in FIG. 8 is too soft for cutting concrete. Bond 5b is rapidly worn down by friction with the concrete and diamond granules 6 soon lie free in active surface 20 of cutting segment 3b. Diamond granules 6 can rapidly fall out under further stress and the chain of a chainsaw for concrete rapidly wears down. In contrast thereto, bond 5 shown in FIG. 9 is too hard. Hard bond 5b is worn down only insufficiently by friction. Diamond granules 6 do not project sufficiently out of active surface 20 in order to bring about an abrasion of the concrete. As a rule, a hard bond 5 is required for cutting abrasive concrete and the softer bond 5 is necessary for cutting hard concrete.

The invention claimed is:

1. A concrete chainsaw chain having a plurality of teeth, said chain comprising
   at least one cutting segment comprising hard-material granules melted in a bond and forming an active surface arranged substantially parallel to a direction of chain travel (L); and
   at least one cutting segment carrier of a tooth comprising a support for the at least one cutting segment, which support is positioned obliquely to the direction of chain travel (L), and wherein the cutting segment tapers in the direction of chain travel (L) to form said parallel surface,
   wherein a molten connection is formed between the at least one cutting segment and the at least one cutting segment carrier.

2. The concrete chainsaw chain of claim 1, wherein the at least one cutting segment widens out conically in a cross section transversely to a direction of chain travel (L), starting from the at least one cutting segment carrier.

3. The concrete chainsaw chain of claim 1, wherein the at least one cutting segment is adapted for a free cut and projects from a surface surrounded by the chain.

4. The concrete chainsaw chain of claim 1, wherein the support stands vertically on a sword surface, falls off counter to the direction of chain travel (L) toward the sword, forms a forwardly running cutting edge and is arranged following a sawtooth at an interval by a groove.

5. The concrete chainsaw chain of claim 1, wherein the at least one cutting segment has a thickness between approximately 7-8 mm.

6. The concrete chainsaw chain of claim 1, wherein the bond contains bronze.

7. The concrete chainsaw chain of claim 1, wherein the bond contains titanium.

8. The concrete chainsaw chain of claim 1, which further comprises an intermediate layer arranged between the at least one cutting segment and the at least one cutting segment carrier.

9. The concrete chainsaw chain of claim 1, wherein the hard-material granules comprise diamond granules.

10. The concrete chainsaw chain of claim 9, wherein the diamond granules have a diameter of on the average approximately 200 μm.

11. A process for manufacturing a concrete chainsaw chain having a plurality of teeth, which chain comprises at least one cutting segment and at least one cutting segment carrier of a tooth having a support for the at least one cutting segment, which support is positioned obliquely to the direction of chain travel (L), the process comprising the steps of
    applying hard-material granules and binding material on the support of the cutting segment carrier,
    melting the binding material to form the cutting segment, so that a molten connection forms thereby between the cutting segment carrier and the cutting segment, and
    wherein the cutting segment tapers in the direction of chain travel (L) thereby forming an active surface arranged substantially parallel to a direction of chain travel (L).

12. The process of claim 11, wherein the binding material is initially a powder, then is compounded with the hard-material granules to form a mixture, and the mixture is applied on the cutting segment carrier.

13. The process of claim 11, which further comprises the step of applying an intermediate layer onto the cutting segment carrier, and wherein the intermediate layer and the cutting segment are melted together.

14. The process of claim 11, wherein the melting is effected by a laser beam.

15. The process of claim 11, wherein the melting to form the cutting segment is supported by at least one ingot mold.

16. The process of claim 11, wherein the cutting segment carrier in that the cutting segment carrier comprises a tooth with a tooth top which stands vertically on a sword surface and falls off counter to the direction of chain travel (L) toward the sword and forms a forwardly running cutting edge and is arranged following a sawtooth at an interval by a groove.

* * * * *